US007171446B2

(12) United States Patent
Gosling et al.

(10) Patent No.: US 7,171,446 B2
(45) Date of Patent: *Jan. 30, 2007

(54) APPARATUS AND METHOD FOR PROCESSING SERVLETS

(75) Inventors: James A. Gosling, Woodside, CA (US); Pavani Diwanji, San Jose, CA (US); David W. Connelly, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 805 days.

This patent is subject to a terminal disclaimer.

(21) Appl. No.: 10/157,734

(22) Filed: May 28, 2002

(65) Prior Publication Data

US 2003/0009519 A1    Jan. 9, 2003

Related U.S. Application Data

(63) Continuation of application No. 09/792,712, filed on Feb. 16, 2001, now Pat. No. 6,405,241, which is a continuation of application No. 09/314,461, filed on May 18, 1999, now Pat. No. 6,247,044, which is a continuation of application No. 08/828,318, filed on Mar. 28, 1997, now Pat. No. 5,928,323, which is a continuation-in-part of application No. 08/756,325, filed on Nov. 25, 1996, now abandoned, which is a continuation of application No. 08/657,712, filed on May 30, 1996, now abandoned.

(51) Int. Cl.
 *G05F 15/16* (2006.01)
(52) U.S. Cl. ........................ 709/203; 709/217; 709/219

(58) Field of Classification Search .................. None
See application file for complete search history.

(56) References Cited

U.S. PATENT DOCUMENTS

| 5,341,477 A | 8/1994 | Pitkin et al. |
|---|---|---|
| 5,452,454 A | 9/1995 | Basu |
| 5,475,421 A | 12/1995 | Palmer et al. |
| 5,475,819 A | 12/1995 | Miller et al. |
| 5,570,291 A | 10/1996 | Dudle et al. |

(Continued)

OTHER PUBLICATIONS

Lowe, Jim, "How Java Servlets Can Replace CGI Scripts-For Ease, Performance & More," Netscape World, May 5, 1997 (http://www.cs.berkeley.edu/.sup..about.padmanab/papers/masters-tr.ps), (http://www.netscapeworld.com/netscapeworld/nw-05-1997//nw-05-bytecode.html).

(Continued)

*Primary Examiner*—John Follansbee
*Assistant Examiner*—Kenny Lin
(74) *Attorney, Agent, or Firm*—Finnegan, Henderson, Farabow, Garrett & Dunner, L.L.P.

(57) ABSTRACT

A method and apparatus for operating a local server computer of a client-server network includes a technique to receive a request from a client computer of the client-server network. A determination is made whether the request requires dynamically generated information from a servlet object of the client-server network. If so, a specified servlet object corresponding to the request may be uploaded from a remote server computer of the client-server network. The specified servlet object is then executed to obtain dynamically generated information corresponding to the request.

16 Claims, 5 Drawing Sheets

U.S. PATENT DOCUMENTS

| | | |
|---|---|---|
| 5,612,730 A | 3/1997 | Lewis |
| 5,630,066 A | 5/1997 | Gosling |
| 5,721,825 A | 2/1998 | Lawson et al. |
| 5,928,323 A | 7/1999 | Gosling et al. |
| 6,012,098 A | 1/2000 | Bayeh et al. |
| 6,075,528 A | 6/2000 | Curtis |
| 6,098,093 A | 8/2000 | Bayeh et al. |
| 6,115,736 A | 9/2000 | Devarakonda et al. |
| 6,163,797 A | 12/2000 | Eckley et al. |
| 6,167,522 A | 12/2000 | Lee et al. |
| 6,247,044 B1 | 6/2001 | Gosling et al. |
| 6,351,816 B1 * | 2/2002 | Mueller et al. ............. 713/176 |
| 6,405,241 B2 | 6/2002 | Gosling et al. |

OTHER PUBLICATIONS

Gorman, Trisha, "Server-Side Applets in Java Generate Developer Anticipation," Netscape World, Jul. 4, 1996, (http://www.netscapeworld.com/netscapeworld/nw-07-1996/mw-07-jeeves, html).

Padmanabhan, Venkata, "Improving World Wide Web Latency," University of California at Berkeley Computer Science Division Report, No. UCB/CSD-95-875, May 1995 (http://www.cs.berkeley.edu/.sup..about.padmanab/papers/masters-tr.ps).

Brown, Mark R., "FastCGI: A High-Performance Gateway Interface," Fifth International World Wide Web Conference, May 2, 1996 (http://www.fastcgi.com/kit/doc/www5-apl-workshop.html).

Editor, "Control of Dynamic Threads Pool for Concurrent Remote Procedure Calls," IBM Technical Disclosure Bulletin, vol. 38, No. 5, May 1995, pp. 199-200.

* cited by examiner

APPARATUS AND METHOD FOR PROCESSING SERVLETS

This is a continuation of application Ser. No. 09/792,712, filed Feb. 16, 2001 (now U.S. Pat. No. 6,405,241 issued Jun. 11, 2002) which is a continuation of application Ser. No. 09/314,461, filed May 18, 1999 (now U.S. Pat. No. 6,247,044 issued Jun. 12, 2001) which is a continuation of application Ser. No. 08/828,318, filed Mar. 28, 1997 (now U.S. Pat. No. 5,928,323 issued Jul. 27, 1999) which is a continuation in part of application Ser. No. 08/756,325, filed Nov. 25, 1996 (now abandoned), which is a continuation of application Ser. No. 08/657,712, filed May 30, 1996 (now abandoned).

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BRIEF DESCRIPTIONS OF THE INVENTION

This invention relates generally to exchanging information in a client-server computer environment. More particularly, this invention relates to an improved technique for responding to information requests at a server computer.

BACKGROUND OF THE INVENTION

Client-server computer networks are well known. The most prominent example of a client-server computer network is the World Wide Web of computers. In a client-server computer network, a server computer receives a request for information from a client computer. Web server software operating on the server computer typically retrieves the requested information from a file stored on a permanent storage device and transmits the file over the network to the client computer that requested the information. The web server software is generally not written using an object oriented programming language. Thus, it is not easily extended to provide new functionality. Given the dynamic nature of today's software marketplace, a product's lack of flexibility and extendibility can seriously hinder the marketability of the product.

Current web server software can generate a file dynamically in response to a request from a client computer. Typically, the web server receives the request and then forks a Common Gateway Interface (CGI) process to dynamically create the file. Once the file has been created, the web server software transmits the file back to the client computer. Unfortunately, it is computationally expensive to fork a process each time dynamic information needs to be generated.

In view of the foregoing, it would be highly desirable to provide a web server which dynamically generates information in response to a client computer request, but which does not incur a process start-up expense while generating the dynamic information. Further, it would be highly desirable to provide an object oriented web server environment that is flexible and extendible.

SUMMARY OF THE INVENTION

The invention includes a method and apparatus for operating a local server computer of a client-server network. The invention includes a technique to receive a request from a client computer of the client-server network. A determination is made whether the request requires dynamically generated information from a servlet object of the client-server network. If so, a specified servlet object corresponding to the request may be uploaded from a remote server computer of the client-server network. The specified servlet object is then executed to obtain dynamically generated information corresponding to the request.

The servlet objects of the invention provide an object oriented web server environment which is flexible and extendible. The client-server network of the invention is populated with the servlet objects. The servlet objects operate in a continual loop until invoked. Thus, there is no startup overhead associated with execution of the servlet objects. By observing a common applications program interface, the servlet objects can run in any server environment. A feature of the invention allows untrusted servlet objects to be executed in a secure area, with the dynamically generated information being passed from the secure area into the remaining server environment.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
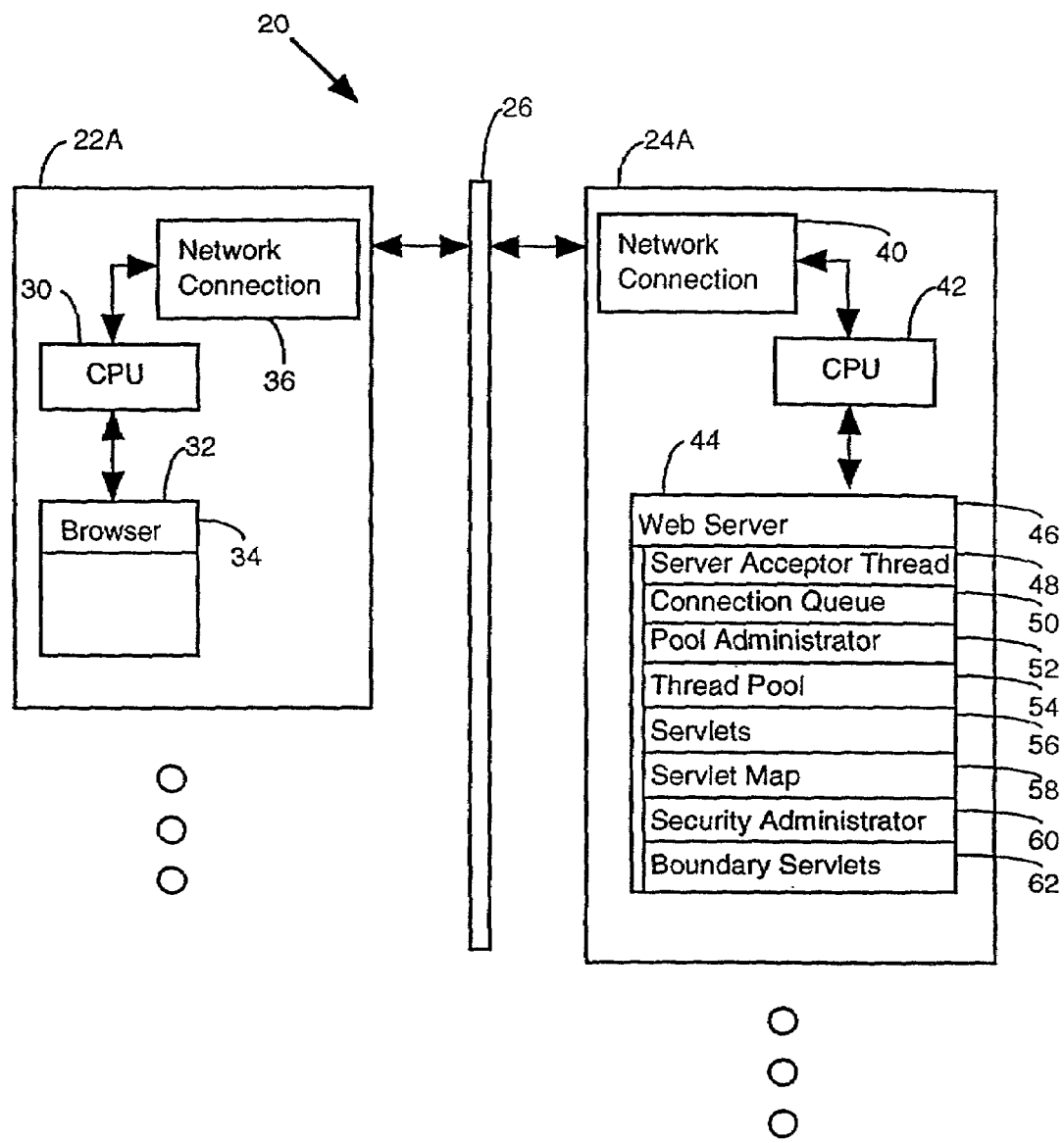
FIG. 1 illustrates a client-server computer network in accordance with an embodiment of the invention.

FIG. 1 illustrates a client-server computer network 20 that may be operated in accordance with the present invention. The network 20 includes at least one client computer 22 and at least one server computer 24. The client computer 22 and the server computer 24 are connected by a transmission channel 26, which may be any wire or wireless transmission channel.

The client computer 22 is a standard computer including a Central Processing Unit (CPU) 30 connected to a memory (primary and/or secondary) 32. The memory 32 stores a number of computer programs, including a "browser" 34. As known in the art, a browser is used to communicate with remote server computers 24 and to visually present the information received from such computers. The client computer 22 establishes network communications through a standard network connection device 36.

The server computer 24 includes standard server computer components, including a network connection device 40, a CPU 42, and a memory (primary and/or secondary) 44.

The memory 44 stores a set of computer programs to implement the processing associated with the invention. The memory 44 stores a web server 46. The web server 46 may be of the type known in the art, which is modified to include the additional programs shown in FIG. 1. That is, in an embodiment of the invention, a standard web server 46 is modified to include a server acceptor thread 48, a connection queue 50, a pool administrator 52, a thread pool 54, servlets 56, a servlet map 58, a security administrator 60, and boundary servlets 62.

Figure 2:
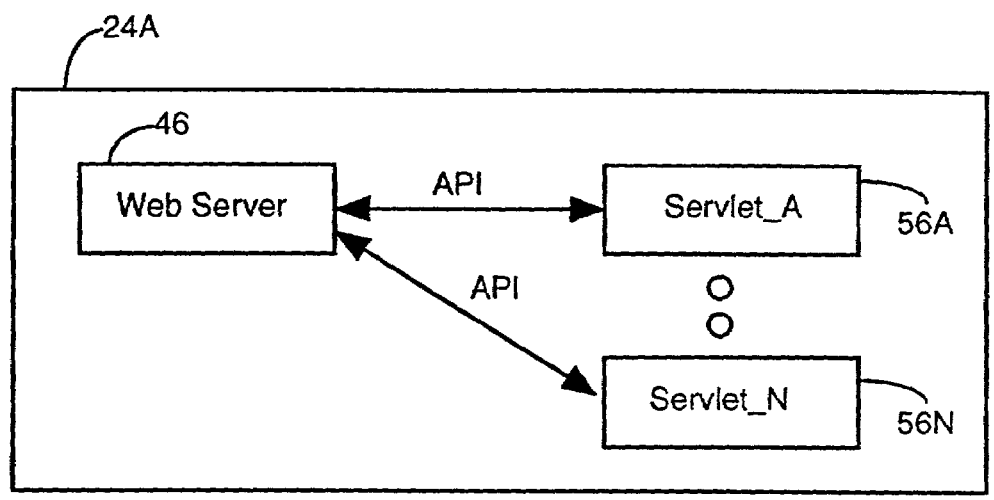
FIG. 2 is a simplified illustration of the interactions between a web server and the servlets of the present invention.

FIG. 2 is a simplified illustration of a server computer 24A constructed in accordance with an embodiment of the invention. The figure shows a web server 46 interacting with a set of servlets 56A–56N. In particular, the web server 46 interacts with the servlets through an application program interface (API). As indicated in FIG. 1, the web server 46 and the servlets 56 are stored in memory 44. The web server 46 may be standard web server software that is modified to include the functionality described herein. Each servlet 56 is a piece of software code which is used to dynamically generate information. Each servlet 56 is an instantiated software object waiting to be invoked. Once it is invoked, it dynamically generates information. Note that this technique of dynamically generating information is distinct from the typical process of fetching static information from a permanent storage device. The technique of the invention is similar to a CGI script in the sense that it dynamically generates information. However, unlike a CGI script, a servlet object of the present invention is instantiated at server start-up. Thus, the servlet can be thought of as operating in a continual loop waiting to be executed. Observe that after instantiation there is no computational start-up expense when the servlet is called.

Figure 3:
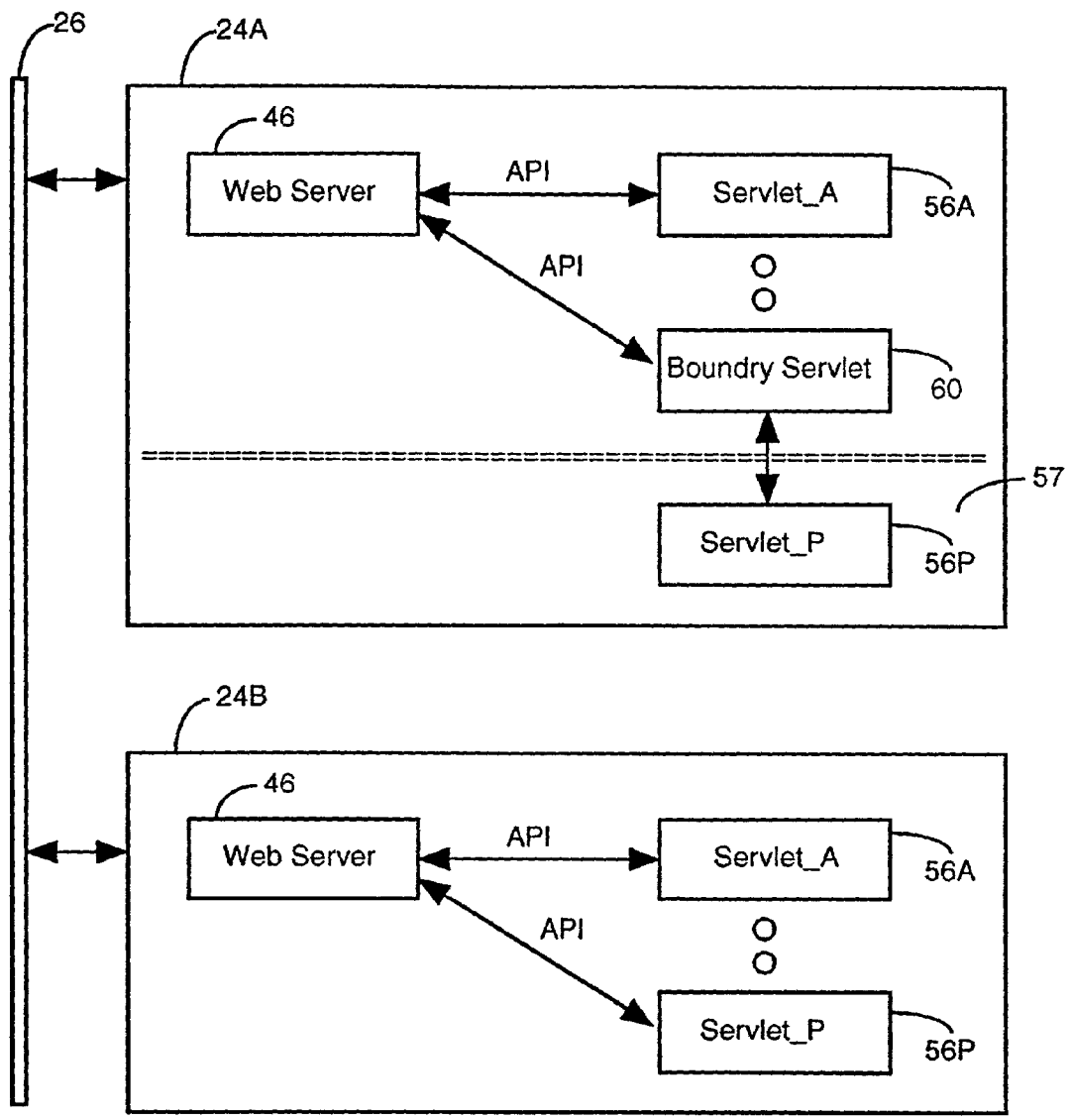
FIG. 3 is a simplified illustration of the interactions between a web server and a servlet loaded from an external server.

FIG. 3 is a general illustration demonstrating additional features of the invention. FIG. 3 illustrates a local server computer 24A which receives a request from a client computer (not shown) over transmission channel 26. The web server 46 determines that dynamically generated information from a servlet object is required. In this case, the servlet object is not initially on the local server computer 24A, thus it is uploaded by the local server computer 24A from a remote server computer 24B using communication link 26. In the example of FIG. 3, servlet 56P is passed from the remote server computer 24B to the local server computer 24A.

FIG. 3 illustrates another feature of the invention. In particular, it illustrates that the uploaded servlet 56P is executed in a security area 57 of the local server computer 24A. After execution, the results are passed to a boundary servlet 60 in the remaining portion of the local server computer 24A. This security feature allows untrusted servlets to be safely executed.

Figure 4:
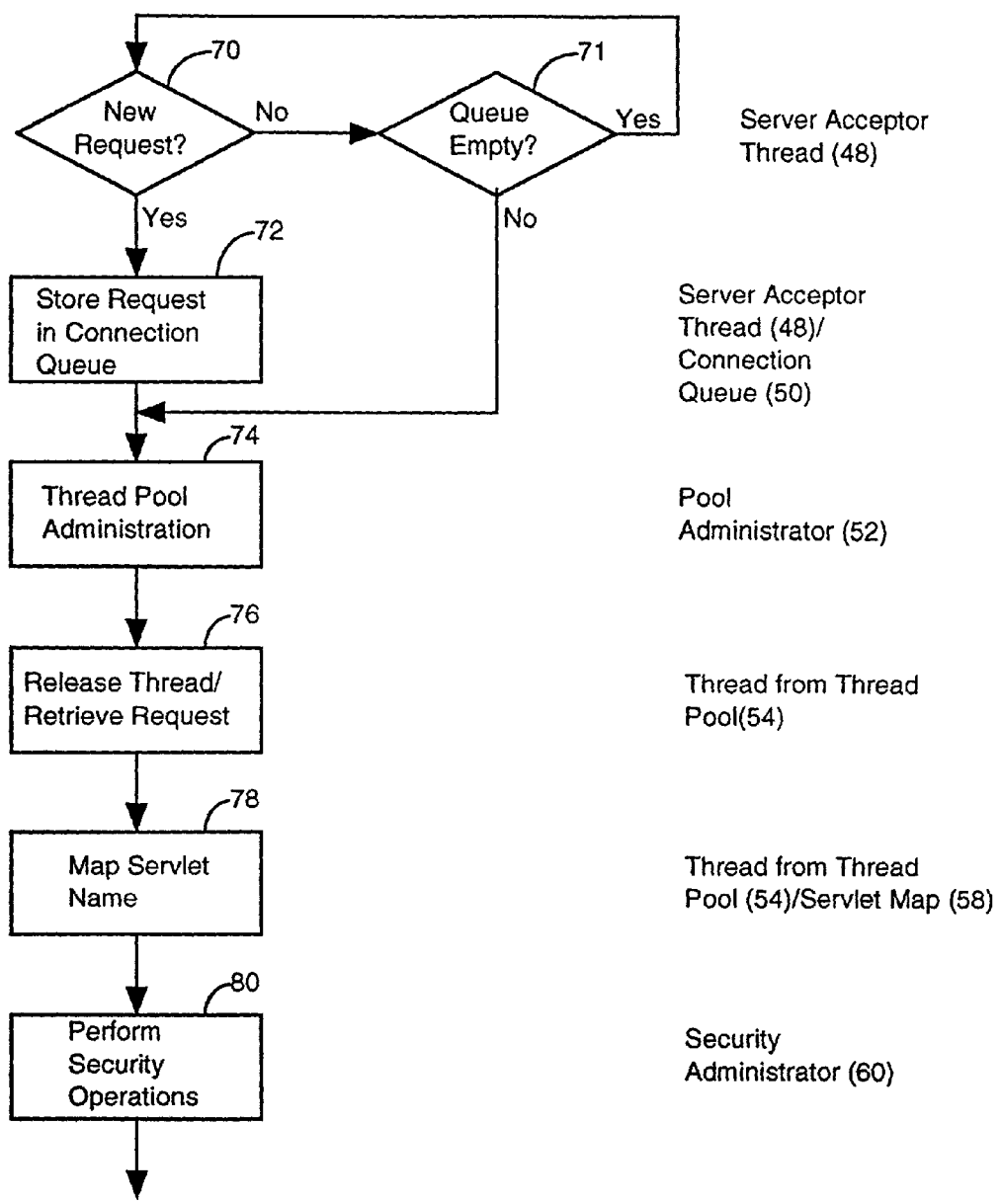
FIG. 4 illustrates processing steps associated with a servlet processing routine in accordance with an embodiment of the invention.

The foregoing discussion provides a general description of the features and benefits of the invention. Attention now turns to a more detailed description of these features and benefits. The left side of FIG. 4 illustrates processing steps associated with an embodiment of the invention. The right side of FIG. 4 illustrates program components that may be used to execute these operations.

The first processing step shown in FIG. 4 is to determine whether a new request has been received (step 70). As indicated above, a request is a request for information from a client computer 22 to a server computer 24. The operation of a client computer 22 requesting information from a server computer 24 is well known. It is typically performed using a Uniform Resource Locator or URL. A URL specifies a computer and a file. A typical URL is http://SU/123. This URL is an instruction to retrieve the file "123" from the State University computer "SU" using the Hypertext Transfer Protocol "HTTP".

As shown in FIG. 4, a server acceptor thread 48 is used to process each new request. Preferably, the invention is implemented as a connection-oriented web server with a server acceptor thread that continually loops while accepting requests. Once a request is received, it dispatches the request to a connection queue (step 72). As shown in FIG. 1, the connection queue 50 is formed in the memory of the local server computer 24.

If no new request is received, then a check is made to determine whether the queue is empty (step 71). If the queue is not empty or a new request has been received, processing proceeds to step 74. Step 74 entails thread pool administration operations, which are executed by a pool administrator 52. FIG. 1 illustrates a thread pool 54. The thread pool 54 is a pool of threads that are used for request processing. Individual threads fetch and process requests from the connection queue 50. The pool administrator 52 operates to ensure that there is a thread for each request in the connection queue 50. The pool administrator 52 creates or forks additional threads to handle new requests in the connection queue 50. If a maximum number of threads is reached, the pool administrator 52 blocks new requests from entering the connection queue 50. In such a case, the server computer does not receive new requests. On the other hand, if a thread has been waiting more than a predetermined period of time for a request from the connection queue 50, then the pool administrator 52 will destroy it. Preferably, a new handler thread is created using the buffer space of a destroyed handler thread. In other words, the invention is preferably implemented by using a specific buffer memory space for a thread. When a thread is destroyed, the buffer memory space is cleared, but it is assigned to a new thread. By reusing allocated memory in this manner, this embodiment of the invention minimizes the amount of memory used by the system, especially when compared to systems which allocate and deallocate memory on a per request basis.

After the thread pool administration operations are performed (step 74) a thread retrieves a request from the connection queue (step 76). The thread then maps the request to a servlet name (step 78). The servlet may be specified by a URL, in which case the mapping process is direct. On the other hand, some translation process may be required to identify which servlet will be able to service the request. The mapping operation may be performed in one of the following ways. A server administrator may specify that some kinds of client requests always map to a particular servlet. For example, one which talks to a particular database. A server administrator may specie that part of the client request is the name of the servlet, as found in an administered servlets directory. At many sites, that directory would be shared between servers which share the load of processing for the site's clients. Some servers may be able to automatically invoke servlets to filter the output of other servlets, based on their administrative configuration. For example, particular types of servlet output may trigger post-processing by other servlets, perhaps to perform format conversions. Properly authorized clients may specify the servlet to be invoked, without administrative intervention.

Security operations may also be performed by the thread (step 80). A security administrator 60 may be used to identify trusted and untrusted classes of servlets. The decision to trust a servlet may be established by a set of rules associated with the security administrator 60. For example, the security administrator 60 may decide to trust all local servlets and mistrust all uploaded network servlets. Untrusted servlets are then executed in the security area 57, as shown in FIG. 3. The security administrator 60 may also be used to determine if the servlet is authorized to perform predetermined risky operations. Security information of this type may be stored in the thread.

JAVA servlets in accordance with the invention provide strong security policy support. This is because all JAVA environments provide a Security Manger which can be used to control whether actions such as network or file access are to be permitted. By default, all servlets are untrusted, and are not allowed to perform operations such as accessing network services or local files. However, servlets "built into" the server, or servlets which have been digitally signed as they were put into JAVA Archive files, may be trusted and granted more permissions by the security manager. A digital signature on executable code indicates that the organization which signed the code "vouches for it" in some sense. Such signatures can't support accountability by themselves, but they do indicate a degree of assurance that may be placed on use of that code. For example, a particular signature from an MIS organization might be required on all code which is granted general access to network services within a corporate intranet. That signature might only be used on code which is strongly believed not to violate particular security policies. Extension APIs in other languages, such as C or scripting languages, can't support such fine grained access controls even if they do allow digital signatures for their code.

Figure 5:
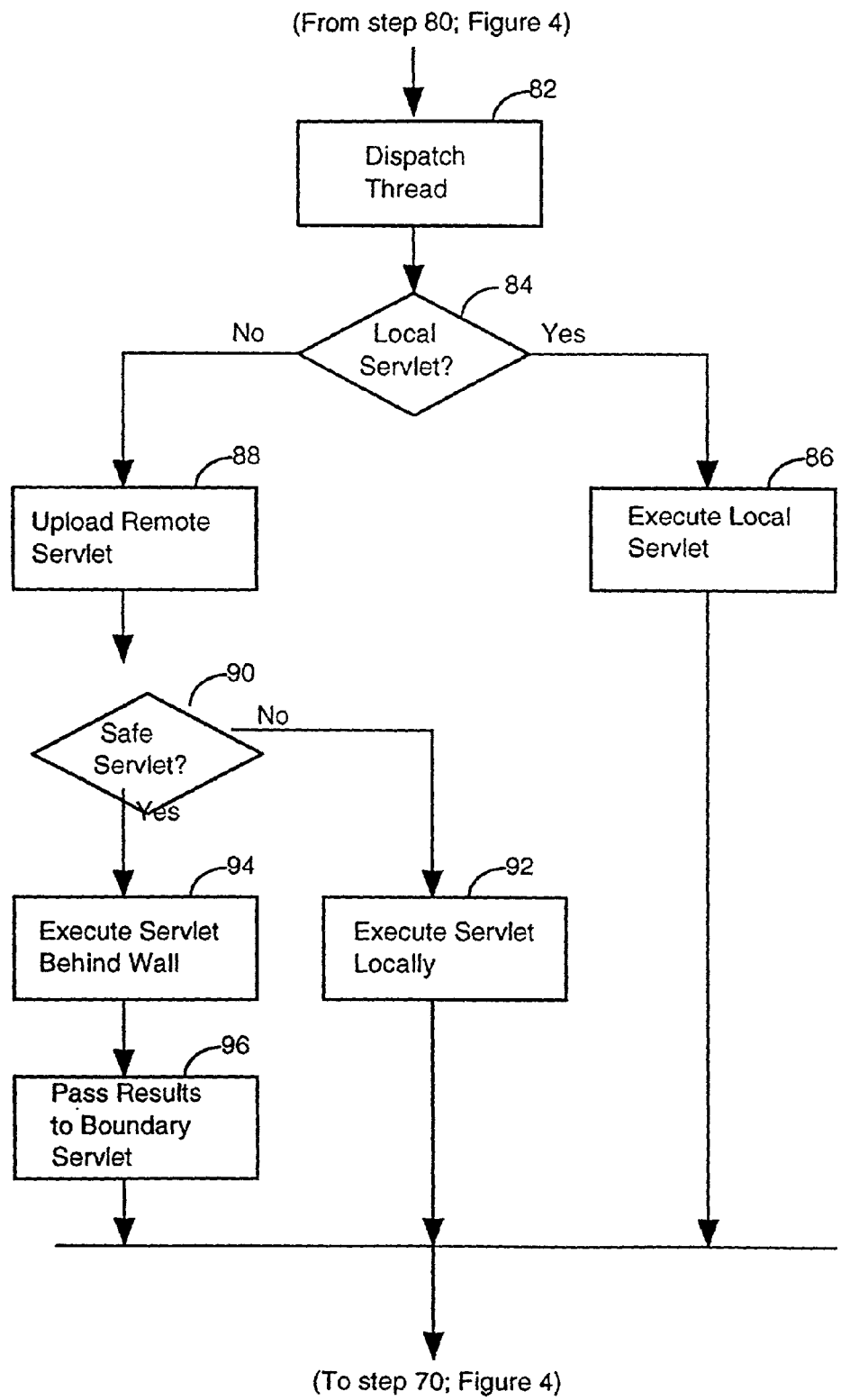
FIG. 5 illustrates processing steps associated with a servlet processing routine in accordance with an embodiment of the invention.

After security operations are performed (step 80), the thread is dispatched (step 82 of FIG. 5). The dispatch operation entails invoking a servlet so that it generates the requested dynamic information. The dispatch operation is one of two types. A decision is made to determine whether the servlet is local (step 84). If the servlet is local, then the local servlet is executed (step 86). This results in the generation of dynamic information that is then processed by the web server 46 in a standard manner. The web server 46 typically passes the information back to the client computer using known techniques. The exchange of information between a servlet and the web server 46 is achieved through an application program interface, which is described below.

If the servlet is not local, then it is uploaded from a remote server 24B (step 88). A decision is then made regarding whether the uploaded servlet is safe (step 90). Recall that the security operation step resulted in the thread acquiring information regarding security parameters for servlets. If there are no security problems associated with the uploaded servlet, then it is executed locally (step 92). On the other hand, if a security problem is identified, then the servlet is executed in a security area (step 94). Thereafter, the dynamically generated results are passed to the non-security area (step 96). A boundary servlet may be used for this purpose. The boundary servlet may be implemented through the use of stubs and subcontracts or through other "fire wall" techniques known in the art. After the servlet is executed, processing returns to step 70 of FIG. 4.

The operation of the invention has now been fully described. Attention now turns to a more particular discussion of the servlet objects that are used in accordance with the invention and an embodiment of the application program interface used in connection with the servlet objects. As indicated above, the servlet objects are objects are software objects that are used to dynamically generate information. They are instantiated objects that sit in a loop waiting to be invoked. Preferably, they are implemented as object bytecodes in the JAVA™ programming language. It is well known that the JAVA™ programming language is used to implement "applets" on a client computer. An "applet" is executable JAVA object bytecodes that are used to generate a graphical display on a client computer. The servlets of the present invention are executed on the server side and do not have graphical content.

A servlet is typically instantiated on server startup. In the alternative, the servlet may be instantiated under a predetermined set of conditions or by client invocation. The servlet may be instantiated and executed by using its URL (e.g., http://host/<servlet URL>). The http protocol supports the passing of arguments, thus, arguments may be passed to the servlet (e.g., http://host/<servlet URL>?<arguments>). The properties object is a JAVA programming language properties class which comprises a set of "name:value" pairs. A system administrator can pass arguments to an instantiated HttpServlet object through the properties object. In this way, the system administrator can "customize" an HttpServlet for a particular server at a particular site. For example, the system administrator can pass the Httpservlet object site specific information about the network location of a database which stores documents that will be requested by client processes across the network or the amount of memory available in system buffers which will be used for processing the server administrator.

Once instantiated, a servlet loops until the server is shut off or a destroy method is called on the servlet by the server. Since the servlet operates in a continual loop as it waits for requests to act upon, the server computer avoids the overhead of creating and destroying the servlet between requests to the servlet. In addition, keeping servlets alive between requests allows servlets to pass data and communicate amongst themselves. For example, servlets can maintain data about a user between sessions by the user. This data can be shared among different servlets in order to customize a working environment within which the user works. If servlets were created and destroyed on a per request basis, it would be much more difficult, if not practically impossible, for a servlet to understand the environment within which it runs and utilize this knowledge to provide improved processing capabilities. The server computer can call a destroy method on the servlet when some resource limit in terms of time, memory, etc. is reached.

The servlet application program interface (API) establishes a standard for interfacing servlets with information servers, such as web servers. The servlet API contains methods for initializing a servlet, processing the request, getting servlet information, and destroying the servlet. The servlet API allows platform independent servlets. An example servlet interface is as follows:

```
Servlet interface:
interface HttpServlet {
    Initialize (ServletContext, ServerProperties);
    Service(HttpRequest, HttpResponse);
    Destroy( );
}
```

The server computer passes objects that implement the "HttpRequest", while the servlet returns an "HttpResponse" object. The "ServletContext" interface is used to exchange information with the server environment. Some of the methods on the "ServletContext" object are "Getserver( )" and "GetServlets( )". "GetServer" returns a pointer to the parent server within which the instantiated Httpservlet runs. Using this pointer, the HttpServlet object can find out information about its parent server. The "GetServlet" method returns pointers to the servlets running on the parent server. The "ServerProperties" interface is used to exchange information regarding specific server properties established by a server administrator.

Servlets support the familiar programming model of accepting requests and generating responses. The following is a simple servlet defining a single method called "service":

```
import java.servlet.*;
public class MyServlet extends GenericServlet {
    public void service (
        ServletRequest request,
        ServletResponse response
    ) throws ServletException, IOException
    {
    ...
    }
    ...
}
```

The service method is provided with Request and Response parameters. These parameters encapsulate the data sent by the client, thereby allowing servlets to report status information, such as errors. Servlets normally retrieve most of their parameters through an input stream, and send their responses using an output stream:

ServletInputStream in=request.getInputStream ( );
ServletOutputStream out=response.getOutputStream ( );

These input and output streams may be used with data in whatever format is appropriate. For example, an applet and servlet might exchange data using object serialization, HTML, or any number of image formats.

Since servlets are JAVA objects, they have instance-specific data. This means that in effect servlets are independent applications running within servers, without needing the complexity of additional classes (which are required by some alternative server extension APIs). Servlets have access to some servlet-specific configuration data at initialization time. This allows different instances of the same servlet class to be initialized with different data, and be managed as differently named servlets. The data provided at initialization time includes an area where each instance keeps its persistent instance-specific state.

Building upon the previous simple servlet examples, the following program code is an example of a servlet that is used to send Hypertext Markup Language (HTML) text when it is invoked:

```
public class SimpleServlet extends GenericServlet {
    public void service(ServletRequest req, ServletResponse res)
        throws ServletException, IOException
    {
        res.setContentType("text/html");
        PrintWriter out = new PrintWriter(res.getOutputStream( ));
        out.println("<HEAD><TITLE> SimpleServlet Output
                </TITLE></HEAD><BODY>");
        out.println("<h1> SimpleServlet Output </h1>");
        out.println("<P>This is output from SimpleServlet.");
        out.println("</BODY>");
        out.flush( );
    }
    public String getServletInfo( ) {
        return "A simple servlet";
    }
}
```

The following program code is an example of a servlet that uses the finger protocol to query information about users on specified host computers. The query string parameters <tt>user</tt>, <tt>hosts</tt>, and <tt>verbose</tt> can be used to specify the user and hosts to query. The parameter <tt>user</tt> is the user name, <tt>hosts</tt> is a comma-separated list of host names to query, and <tt>verbose</tt>, if specified, will cause verbose output to be generated. For example, <pre> http:/goa/finger.html?user=dac&hosts=eno, doppio&verbose=yes </pre> will request full information about user "dac" on both hosts "eno" and "doppio".

```
public
class FingerServlet extends GenericServlet {
    /*
     * Port number for finger daemon.
     */
    static final int FINGER_PORT = 79;
    /**
     * Handles a single finger request from the client.
     */
    public void service(ServletRequest req, ServletResponse res)
            throws ServletException, IOException
    {
        String user = req.getParameter("user");
        String hosts = req.getParameter("hosts");
        String verbose = req.getParameter("verbose");
        res.setContentType("text/html");
        PrintStream out = new PrintStream(res.getOutputStream( ));
        out.println("<html>");
        out.println("<head><title>Finger Servlet</title></head>");
        out.println("<body>");
        out.println("<h2>Finger results:</h2>");
        outprintln("<pre>");
        if (hosts == null) {
            finger(out, user, null, "yes".equalsIgnoreCase(verbose));
        } else {
            StringTokenizer st = new StringTokenizer(hosts, ",");
```

-continued

```
            while (st.hasMoreTokens( )) {
                String host = st.nextToken( );
                out.println("[" + host + "]");
                try {
                    finger(out, user, host,
                    "yes".equalsIgnoreCase(verbose));
                } catch (IOException e) {
                    out.println(e);
                }
                out.println( );
            }
        }
        out.println("</pre>");
        out.println("</body></html>");
    }
    /*
    *   Sends finger output for a user and host to the specified output
    *   stream.
    */
    void finger(OutputStream out, String user, String host, boolean verbose)
        throws IOException
    {
        // open connection to finger daemon
        Socket s;
        if (host == null) {
            s = new Socket(InetAddress.getLocalHost( ), FINGER_PORT);
        } else {
            s = new Socket(host, FINGER_PORT);
        }
        // send finger command
        PrintStream ps = new PrintStream(s.getOutputStream( ));
        if (verbose) {
            ps.print("/W");
        }
        if (user ! = null) {
            ps.print(user);
        }
        ps.print("\r\n");
        ps.flush( );
        // copy results to output stream
        InputStream in = s.getInputStream( );
        byte[ ] buf = new byte [512];
        int len;
        while ((len = in.read(buf, 0, buf.length)) != -1) {
            out.write(buf, 0, len);
        }
        s.close( );
    }
}
```

Those skilled in the art will appreciate that servlets which are being used with the HTTP protocol may support any HTTP method, including GET, POST, HEAD, and more. They may redirect requests to other locations, and send HTTP-specific error messages. They can get access to parameters which were passed through standard HTML forms, including the HTTP method to be performed and the URI, which identifies the destination of the request.

As indicated above, one of the biggest performance features of servlets is that they do not require creation of a new process for each request. In most environments, many servlets run in parallel within the same process as the server. When used in such environments with HTTP, servlets provide compelling performance advantages over both the CGI approach and the Fast-CGI approach. This is because servlets have a small computational expense during thread context switches. Since in most environments servlets can handle many client requests each time they are initialized, the cost of the initialization is spread over many methods. All the client requests to that service have the opportunity to share data and communications resources, benefitting more strongly from system caches.

Those skilled in the art will appreciate that the servlets of the invention can be used to dynamically extends Java-enabled servers. The servlets provide a general framework for services built using the request-response paradigm. The servlets can provide secure web-based access to data which is presented using HTML web pages and they can be used for interactively viewing or modifying that data using dynamic web page generation techniques.

The servlets of the invention may be used to provide customized multi-user services for customer bases. The servlets are also flexible enough to support standardized services, such as serving static web pages through the HTTP (or HTTPS) protocols, and proxying services. Since they are used for dynamic extensibility, they may be used in a plug-in style, supporting facilities such as search engines and semi-custom applications, such as web-based order entry or inventory systems.

Although the servlets are preferably written in JAVA, the servlet clients may be written in any language. When servlets are used in the middle tiers of distributed application systems, they can in turn be clients to other services, written in any language.

Those skilled in the art will appreciate that servlets may be used in several modes. The basic mode is at the core of a request/response protocol. In addition, servlets may be specialized to support protocols such as HTTP. In HTTP based applications, servlets are portable, complete, and much more efficient replacement for CGI based extensions. Also, in HTTP applications, servlets may be used with HTML server side includes to dynamically generate part of a web document.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

The invention claimed is:

1. A method of interfacing servlet objects, capable of dynamically generating information, with a server computer, the method comprising:
   instantiating said servlet objects at the startup of said server computer;
   communicating, in response to a request from a client computer, dynamically generated information from said servlet objects to the requesting client computer; and
   maintaining a continual operation of said servlet objects between requests from said client computer.

2. The method of claim 1, wherein the operation of said servlet objects are maintained until said server computer is shutdown or a destroy method is called by said server computer.

3. The method of claim 2, wherein a destroy method is called by said server computer when a specified resource limit has been reached.

4. The method of claim 3, wherein said specified resource limit is defined in terms of time or memory space.

5. The method of claim 1, wherein said servlet objects pass data and communicate with each other.

6. The method of claim 1, further comprising processing said request from said client computer through the use of a pool of server acceptor threads running on the server computer.

7. The method of claim 6, wherein processing said request from said client computer comprises:
   mapping said request to a servlet object specified in the request.

8. The method of claim 6, wherein processing said request from said client computer comprises:
   mapping said request to a servlet object using a translation process.

9. A computer readable memory that can be used to interface servlet objects, capable of dynamically generating information, with a server computer, comprising:
   a first set of instructions to instantiate said servlet objects at the startup of said server computer;
   a second set of instructions to communicate, in response to a request from a client computer, dynamically generated information from said servlet objects to the requesting client computer; and
   a third set of instructions to maintain a continual operation of said servlet objects between requests from said client computers.

10. The computer readable memory of claim 9, wherein the operation of said servlet objects are maintained until said server computer is shutdown or a destroy method is called by the server computer.

11. The computer readable memory of claim 10, further comprising:
    a fourth set of instructions to call a destroy method when a specified resource limit has been reached within said server computer.

12. The computer readable memory of claim 11, wherein said specified resource limit is defined in terms of time or memory space.

13. The computer readable memory of claim 9, wherein said servlet objects pass data and communicate with each other.

14. The computer readable memory of claim 9, further comprising:
    a fifth set of instructions for processing said request from said client computer through the use of a pool of server acceptor threads running on said server computer.

15. The computer readable memory of claim 14, wherein processing said request from said client computer comprises:
    mapping said request to a servlet object specified in the request.

16. The computer readable memory of claim 15, wherein processing said request from a client computer comprises:
    mapping said request to a servlet object using a translation process.

* * * * *